United States Patent
Blawat et al.

(10) Patent No.: US 7,395,318 B2
(45) Date of Patent: Jul. 1, 2008

(54) METHOD FOR COMMUNICATION BETWEEN NODES IN PEER-TO PEER NETWORKS USING COMMON GROUP LABEL

(75) Inventors: Meinolf Blawat, Hannover (DE);
Dietmar Hepper, Hannover (DE);
Stefan Kubsch, Hohnhorst (DE);
Wolfgang Klausberger, Hannover (DE);
Dirk Adolph, Ronnenberg (DE)

(73) Assignee: Thomson Licensing, Boulogna Billancourt (FR)

( * ) Notice: Subject to any disclaimer, the term of this patent is extended or adjusted under 35 U.S.C. 154(b) by 771 days.

(21) Appl. No.: 10/720,917

(22) Filed: Nov. 24, 2003

(65) Prior Publication Data
US 2004/0148411 A1 Jul. 29, 2004

(30) Foreign Application Priority Data
Dec. 4, 2002 (EP) .................................. 02027121

(51) Int. Cl.
*G06F 15/16* (2006.01)
(52) U.S. Cl. ....................................... 709/219; 709/229
(58) Field of Classification Search ........................ None
See application file for complete search history.

(56) References Cited

U.S. PATENT DOCUMENTS

| 6,064,297 | A | | 5/2000 | Odinak et al. |
| 6,816,589 | B2 | * | 11/2004 | Pinard .................... 379/265.01 |
| 7,130,621 | B2 | * | 10/2006 | Blawat et al. ................ 455/418 |
| 7,136,927 | B2 | * | 11/2006 | Traversat et al. ............. 709/230 |
| 2002/0156893 | A1 | | 10/2002 | Pouyoul et al. |
| 2003/0055892 | A1 | * | 3/2003 | Huitema et al. ............. 709/204 |
| 2004/0064693 | A1 | * | 4/2004 | Pabla et al. .................. 713/168 |
| 2006/0077952 | A1 | * | 4/2006 | Kubsch et al. .............. 370/351 |

FOREIGN PATENT DOCUMENTS

WO 02/057917 A2 7/2002

* cited by examiner

*Primary Examiner*—John B. Walsh
(74) *Attorney, Agent, or Firm*—Joseph J. Laks; Robert B. Levy

(57) ABSTRACT

An architecture for a multimedia peer-to-peer home network allows the simple definition of peer groups, or zones, where each peer is capable of automatically identifying whether other peers are members of the same group, or of another group, by using group labels. Each peer may freely cooperate with the other peers of the same group, or with peers of previously specified other groups. e.g. exchange information or share resources. The architecture aims to map an atmosphere of trust existing between users to a technical system. namely their respective home networks. Using this architecture, it is e.g. possible that users who trust each other may give each other access to their own home network, or parts of it.

10 Claims, 4 Drawing Sheets

METHOD FOR COMMUNICATION BETWEEN NODES IN PEER-TO PEER NETWORKS USING COMMON GROUP LABEL

FIELD OF THE INVENTION

This invention relates to a method for communication between technical devices being network nodes, e.g. digital electronic consumer devices but also computers.

BACKGROUND OF THE INVENTION

In computer technology it is well known to build up a network of connected devices for exchanging data and sharing hardware resources. The separate devices are commonly called nodes. At the time being, nodes are usually computers, but can be other technical devices, and their interconnections are mainly electrically, optically or wireless radio connections. Networks can be classified as being based on either client-server or peer-to-peer (P2P) architectures. In P2P based networks a node is also referred to as a peer. While in client-server architectures each node is defined to be either client or server, there is no such differentiation in P2P networks. Instead, peers include both, server and client functionalities. P2P technology enables each node to be capable of providing services or resources to any other node in the network, or use services or resources provided by any other node in the network.

P2P networks are usually not restricted to any special applications or underlying network topologies, but can be understood as a set of nodes, or peers, which rely on certain sets of specific protocols. It is characteristic for a P2P network that the peers communicate directly with other peers, so that no central network organization is required. Most P2P networks support that peers can be connected to the network or disconnected from the network at any time.

The mentioned P2P protocols are required for basic network organization, such as e.g. discovery of other connected peers, offering own services or resources to other peers (advertising), understanding other peers' advertising messages, or allocating connection capacity for establishing certain connections to other peers. Also, there are protocols that enable a group of peers to cooperate, and thus form a peer-group. Such peer-groups are usually used for providing a common set of services within the peer group. Nevertheless, the purpose of a peer-group is not generally defined. A peer belonging to a peer-group normally has access to, and can be accessed from, all other connected peers of the same group. Additionally, each peer may be a member of further peer-groups. For adding or removing peers to or from a peer group, the user is always required to perform certain administrative activities.

Generally only authorized users have access to the peers, or to the peers' contents, or to released parts of the peers' contents, where authorization of the user is achieved by a user-specific key, either physical or virtual secret key, e.g. password.

Since peers must be regarded as individuals, it is necessary that each peer can be unambiguously addressed by using an identifier. Usually a peer is addressed by using a unique label, e.g. a so called Universal Unique Identifier (UUID).

When peers form a peer-group, the peer-group as such usually gets a dedicated label, e.g. UUID, which can be used for identifying the members of the group.

The described peer-to-peer networks and mechanisms are in a detailed manner published e.g. in WO 02/057917 A2.

SUMMARY OF THE INVENTION

A problem to be solved by the invention is to reduce the required amount of technical administration when establishing communication between peer-to-peer networks, with each of said networks being under control of its respective owner, like e.g. home networks. This problem is solved by the method disclosed in claim 1. An apparatus that utilizes this method is disclosed in claim 10.

According to the invention peers belonging to different P2P groups can communicate with each other, and access each other's content or services, if said P2P groups are known to each other. Administrational effort for the user is also reduced by not requiring user authentication for accessing any connected peer, or content associated with such peer. As a consequence of using the invention, a user can have his devices connected to a network without having any special networking knowledge.

Advantageous additional embodiments of the invention are disclosed in the dependent claims, the following description and the figures.

BRIEF DESCRIPTION OF THE DRAWINGS

Exemplary embodiments of the invention are described with reference to the accompanying drawings, which show in FIG. 1 an exemplary peer-to-peer network forming an Owner Zone, including an owner's home and other property.

DETAILED DESCRIPTION OF PREFERRED EMBODIMENTS

A person's home is a private place, not open to the public. The home is locked to prevent unwelcome persons from entering, but naturally welcome persons, such as family members, may always enter, and other welcome persons, such as guests, may enter at certain times. This corresponds to a relation of trust between the owner, or owner group, and the mentioned other persons. As a consequence, said trusted other persons usually have access to some, or most, or all, equipment within the owners home, including technical devices and media, e.g. radio, books, CDs. Nevertheless, there are always some things which may only be accessed by their respective owner, or by certain groups of persons such as family. Further, it is common to lend certain property, such as a book or a music CD, to trusted persons.

The invention maps the described personal relationship to a technical system, namely a multimedia home network, including electronic storage devices, such as e.g. CDs or DVDs, and to the connection between multimedia home networks belonging to different households. The invention employs the concept of P2P networking, and therefore refers to the respective technical devices as peers.

Figure 1:
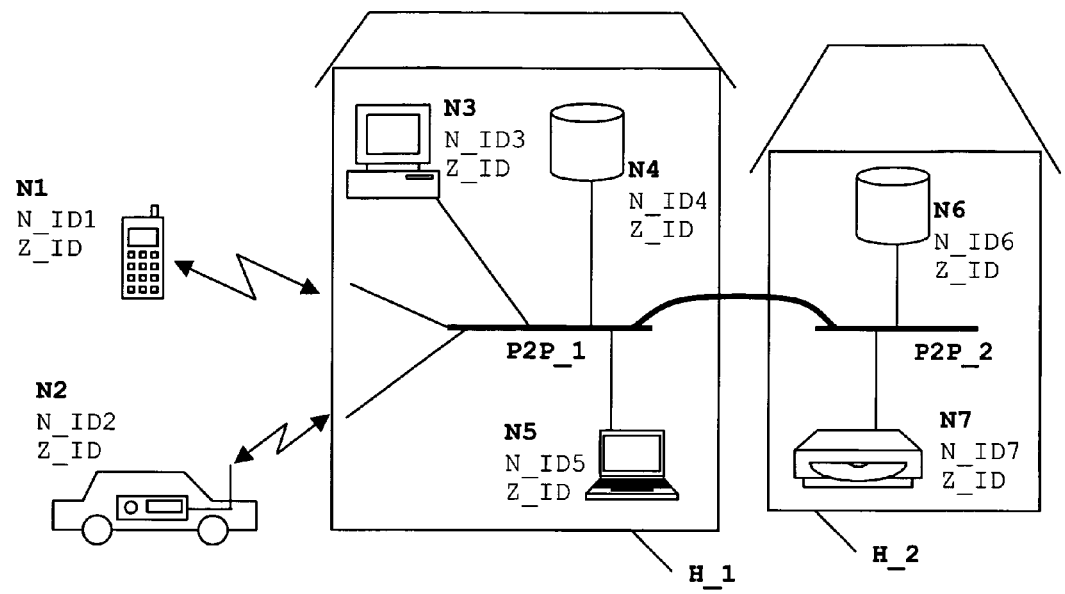

Connecting the technical devices of a household to a P2P network provides more user convenience, e.g. allows the owner to control devices remotely, or to share contents or services between different devices. For privacy reasons the P2P network comprises only peers belonging to the same household, or owner. Since the peers may be located outside the household, e.g. in the owners car, garden, or may be portable, the terminus "Owner Zone" is used to describe the group of devices, or peers, which is under control of the same owner, or group of owners, e.g. family. FIG. 1 shows an exemplary Owner Zone, which includes the peers being under control of the same owner. The peers N1, ..., N7 within the owners home H_1 are connected to a local P2P network P2P_1, the owners mobile peers N1,N2 are connected to the same P2P network, and other peers N6,N7 within another building H_2 belonging to the same owner are connected to another local P2P network P2P_2, and said two networks P2P_1, P2P_2 are connected to each other.

According to the invention the peers with physical access to the owner's home network are members of the Owner Zone, using known P2P mechanisms such as peer discovery, peer resolving, advertising and others. There is no connection allowed to any other peer outside the Owner Zone, unless any of the mechanisms described below is used.

Further the invention comprises that connections between peers can have one of a specified number of states, e.g. internal or external. The state of a connection can be assigned to said connection by using any means, e.g. plug coding or software control.

According to the invention, the Owner Zone is identified with a unique label, e.g. a Universal Unique Identifier (UUID). Additionally, the peers may be identified with unique labels, e.g. UUID, so that the peers belonging to an Owner Zone are uniquely identified with a tuple of labels, namely their respective unique node label and the Owner Zone's unique label. These labels are referred to in the following as Node_UUID and Zone_UUID, respectively. Only one group related label, or Zone_UUID, is assigned to a peer. A peer within an Owner Zone can identify all other peers within the same Owner Zone by comparing their Zone_UUID to its own Zone_UUID and finding that the Zone_UUIDs are identical. In FIG. 1 each node N1, ..., N7 has a corresponding node label N_ID1, ..., N_ID7 and a group label Z_ID.

Different Owner Zones may communicate with each other, or access each others content or services, when following the rules defined below.

An Owner Zone may contain an informative section, e.g. data set, providing information regarding the structure and/or contents of the Owner Zone. This informative section is referred to in the following as Zone_Info_Data. Analogously, a peer within an Owner Zone may contain an informative section, e.g. data set, providing information regarding the structure and/or contents of the peer, which informative section is referred to in the following as Node_Info_Data. Within the Owner Zone, the mentioned informative sections are marked with unique labels, e.g. Zone_Info_UUID and Node_Info_UUID, respectively. The mentioned Zone_Info_Data may be updated automatically and may contain information like e.g. Zone_UUID, optional Zone_Name, optional Zone_Service_List or other information mentioned below.

Said optional Zone_Name may be a readable name under which the Owner Zone is addressed by other Owner Zones, thus partly being an alias for the Zone_UUID, but unlike a Zone_UUID not necessarily being unique. In case of a first Owner Zone addressing a second Owner Zone, and said second Owner Zone having a non-unique Zone_Name, it will be necessary for said first Owner Zone to specify said second Owner Zone uniquely, e.g. by internally mapping said second Owner Zones Zone_Name to said second Owner Zones Zone_UUID.

Said optional Zone_Service_List may define which services the Owner Zone offers to other Owner Zones, if said other Owner Zones are permitted to access. The Zone_Service_List may also define in a detailed manner which service shall be accessible for which of said other Owner Zones, including the optional definition of an access timeframe.

The mentioned group label, e.g. Zone_UUID, can be created when an owner decides to create an Owner Zone, and it can be discarded when the owner decides to discard the respective Owner Zone. Especially, when a first peer is connected to a second peer, thus building a new Owner Zone, and the peers detect that there is no Zone_UUID defined yet for the new zone, then both peers negotiate a new Zone_UUID without user interaction. Otherwise, when a first peer is connected to a second peer, and said first peer has no Zone_UUID defined yet, but said second peer already belongs to an Owner Zone and therefore has a Zone_UUID defined, then the Zone_UUID of the resulting P2P network may remain unchanged, so that said Zone_UUID can be transmitted from said second peer to said first peer. In another embodiment of the invention a new Zone_UUID may be negotiated for said resulting P2P network.

If an Owner Zone being accessible from another Owner Zone gets a new Zone_UUID, it may be advantageous to store the old Zone_UUID, or old Zone_UUIDs, so that said other Owner Zone can be informed about the change, or messages from said other Owner Zone using said old Zone_UUID are not rejected. The old Zone_UUID can e.g. be stored in the Zone_Info_Data section of the resulting Owner Zone.

Figure 2:
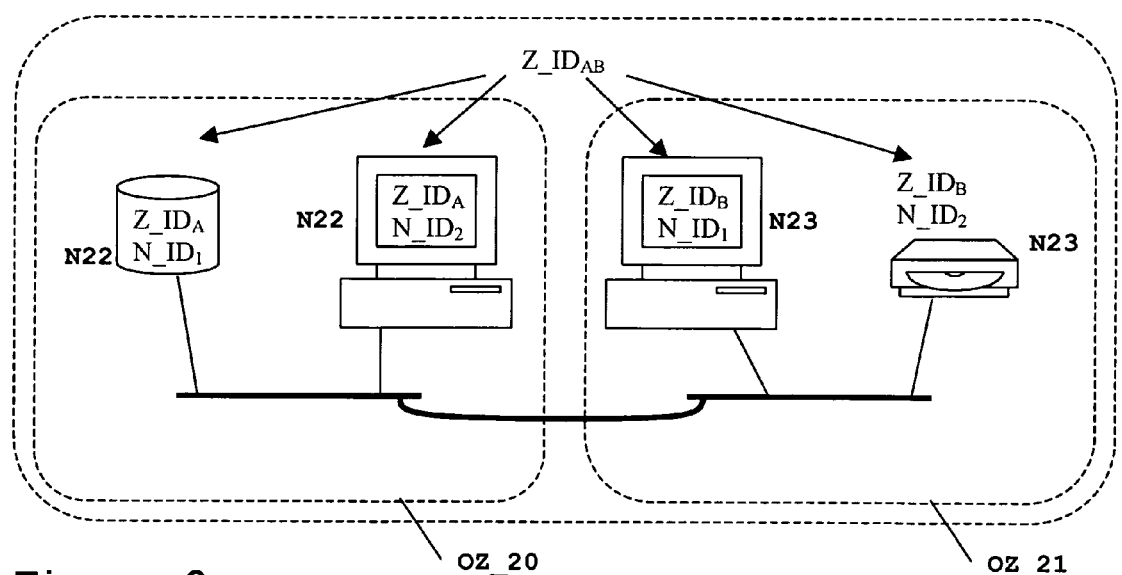
FIG. 2 how two Owner Zones are merged into one new Owner Zone.

Advantageously, the described labelling concept for an Owner Zone can be used to easily merge two or more Owner Zones, as shown in FIG. 2. When two Owner Zones shall be merged, the first Owner Zone OZ_20 being labelled with a Zone_UUID $Z\_ID_A$, and the second Owner Zone OZ_21 being labelled with a Zone_UUID $Z\_ID_B$, then an exemplary method is to negotiate a new zone label, e.g. Zone_UUID$_{AB}$, which may be different from Zone_UUID$_A$ and Zone_UUID$_B$, and then assign said new zone label to all peers N22,N23 belonging to said first Owner Zone OZ_20 or said second Owner Zone OZ_21.

When two Owner Zones, here being referred to as Sources, are merged into a new Owner Zone, then new Zone_Info_Data can be generated in order to describe the structure and/or contents of the new Owner Zone. Especially, the new Zone_Info_Data may contain information about both said Source Owner Zones, e.g. their respective Zone_UUIDs, Zone_Names and others, and thus making it possible to track on Owner Zone modifications.

Since the described method of merging two Owner Zones can be applied to any two Owner Zones, at least one of the previously described steps is performed, or approved, by the respective owners of said first and second Owner Zones. Further, the described method of merging can be recursively applied when more than two Owner Zones shall be merged. In the case of merging more than two Owner Zones, the resulting Zone_Info_Data may contain information about several, or all, merged Source Owner Zones. Advantageously, the described mechanism for merging enables the user to merge all his Owner Zones, which may be in various locations, into one Owner Zone. Therefore an Owner Zone is not limited to the user's home, as shown in FIG. 1.

Likewise, the described labelling concept for an Owner Zone can be used to easily split one Owner Zone into two or more Owner Zones. When an Owner Zone, being labelled as e.g. Zone_UUID$_A$, shall be split, then an exemplary method is to calculate a new label, e.g. Zone_UUID$_B$, and then assign said new label to all peers being intended to belong to the new Owner Zone, thus discarding the old zone label for said peers. Likewise, the remaining peers, being labelled as Zone_$UUID_A$, can be assigned a new zone label, e.g. Zone_$UUID_C$, if the old label Zone_$UUID_A$ may not be used any more.

When an Owner Zone, here being referred to as Source, is split into two Owner Zones, here being referred to as Targets, the owner of the Source Owner Zone will have to specify for the associated peers, contents and services one of said Target Owner Zones. New Zone_Info_Data can be generated for both said Target Owner Zones, describing their respective structure and/or contents, and especially including information about said Source Owner Zone, e.g. its Zone_UUID.

Figure 3:
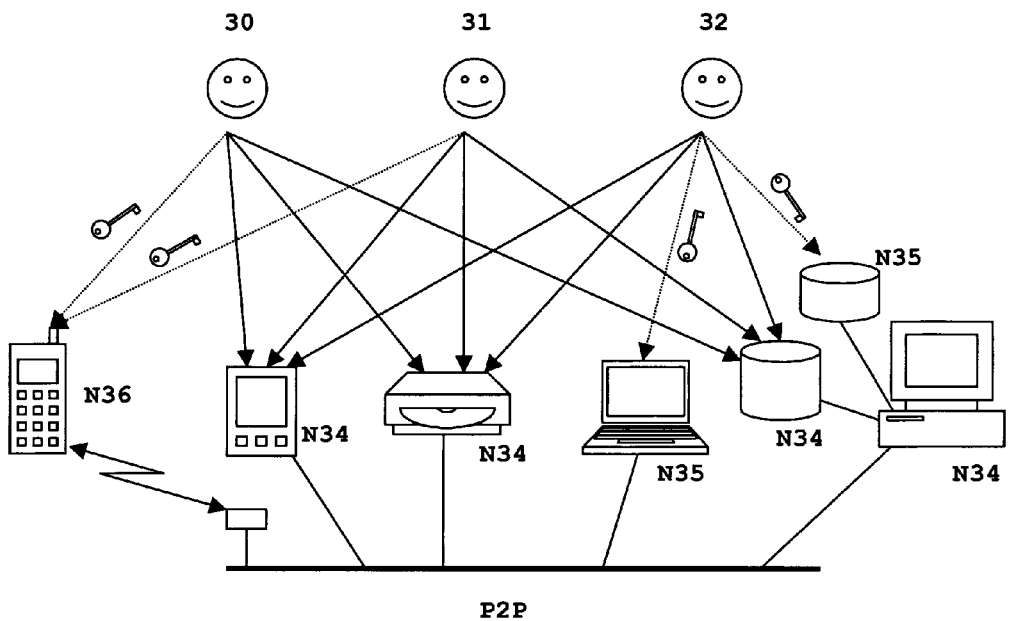
FIG. 3 an exemplary peer-to-peer network forming an Owner Zone, which comprises contents with restricted access.

Furthermore, within an Owner Zone there is no need for explicit user identification, since every user with access to any connected peer is implicitly authorized to access the whole P2P network. The individual user is anonymous. In other words, authentication is related to the peer, not to the user. From the owner's point of view, this reflects a relation of trust existing among all persons within the owner's home, e.g. family. This does not exclude the possibility of assigning a lock mechanism, e.g. password, to certain content or a certain service, and thus limiting the number of users having access to said content or service. In such a case knowledge of a user-independent key, e.g. password, is required to access said protected content or service, so that user authentication is not needed. FIG. 3 shows a group of users 30,31,32 having access to a number of peers, which are connected via a P2P network P2P. For some peers N34 all said users have free access, while for other peers N35,N36 access is limited to those users who have, or know, the respective key. A single user 32 has sole access to content or service N35, while other content or service N36 can be accessed by more than one user 30,31.

With the described method for content locking, it is likely that a super-user function is required, since it may happen that a key gets lost. A super-user function can use arbitrary methods, e.g. include the right to delete contents, and thus can solve the situation of contents being locked and the key being lost.

As mentioned above, communication between different Owner Zones is allowed when the following method is used. A first owner of a first Owner Zone can express a relation of trust towards a second owners Owner Zone, and thus give peers of said second Owner Zone access to certain content of said first Owner Zone. When a relation of trust is expressed from a first Owner Zone towards another, second Owner Zone, then said second Owner Zone is referred to as a "Trusted Zone" relative to said first Owner Zone. This relation of trust can be expressed towards any number of other Owner Zones. This may be implemented such that an Owner Zone contains a list of other Owner Zones which are regarded as Trusted Zones, where said other Owner Zones are represented e.g. by their respective unique labels. Said list of Trusted Zones may be part of the previously mentioned Zone_Info_Data. For each of said Trusted Zones it can be defined which peers within the Owner Zone may be accessed, or which contents or services within the Owner Zone may be accessed.

Figure 4:
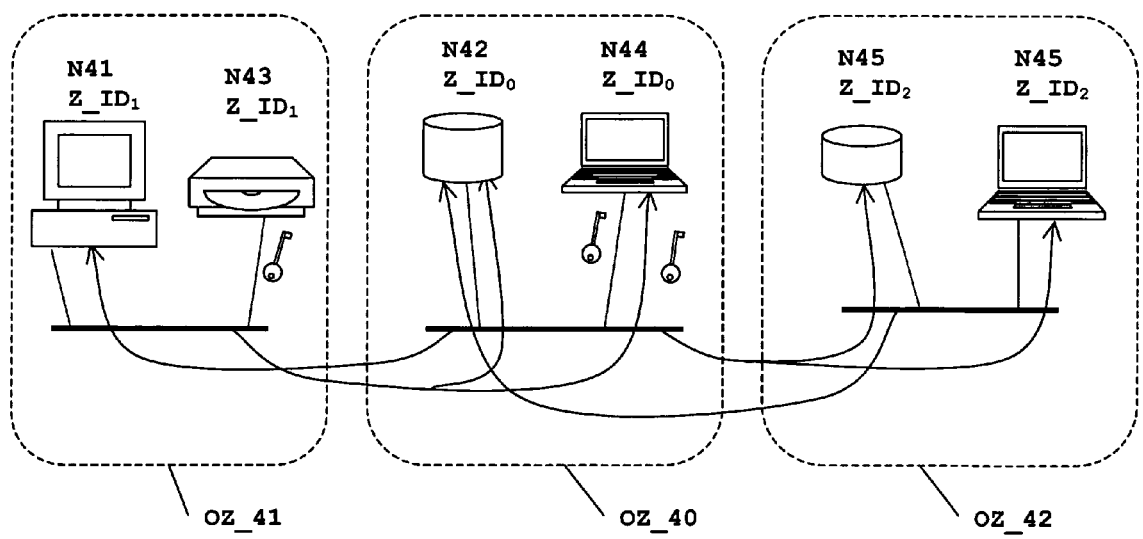
FIG. 4 an Owner Zone and exemplarily two related Trusted Zones, where the relationship of trust is bi-directional.

FIG. 4 shows an exemplary Owner Zone OZ_40, consisting of peers 42,44 being labelled $Z\_ID_0$, and two related Trusted Zones OZ_41,OZ_42, with the belonging peers N41, N43 and N45 being labelled $Z\_ID_1$ and $Z\_ID_2$, respectively. Peers within said Owner Zone OZ_40 may connect to peers within said Trusted Zones OZ_41,OZ_42 and access content or services from nodes N41,N45. Vice versa, peers from said Trusted Zones OZ_41,OZ_42 can connect to peers N42,N44 within said Owner Zone OZ_40 and access content or services. Certain content or service on a peer N43 within one Trusted Zone OZ_41 is locked as described before, and the key is not known in said Owner Zone OZ_40, so that the peers from the Owner Zone OZ_40 may not access said content or service. Further, certain content or service on a node N44 within the Owner Zone OZ_40 is locked as described before, and the key is known in a Trusted Zone OZ_41, so that peers from said Trusted Zone may access said content or service.

The described communication method between different Owner Zones may include that a number of predefined levels of trust exists within an Owner Zone, or globally, and the Owner Zone may have assigned for its Trusted Zones certain levels of trust. If said number of predefined levels of trust contains a hierarchy, then said Owner Zone may require for each of its contents or services a minimum level of trust.

Furthermore, it is possible that access between an Owner Zone and a related Trusted Zone is limited to a certain time frame if agreed upon between the owner of the Owner Zone and the owner of the Trusted Zone.

For establishing communication between an Owner Zone and a related Trusted Zone, it should not be necessary for the requesting zone to know more than the Zone_UUID of the requested zone, especially it is not necessary to know any Node_UUID, or content or service details about the requested zone. An exemplary method of establishing contact between Owner Zones is described in the following.

When a first peer belonging to a first Owner Zone receives a request for communication from a second peer belonging to a second Owner Zone, then the request contains the Zone_UUID of said second, requesting Owner Zone, and it may contain a specification of what is requested. The first, requested peer compares in a first step said Zone_UUID to its list of Trusted Zones, and thus detects if the requesting second peer belongs to any of these Trusted Zones. If this is the case, then the first, requested peer analyses in a second step the received request for details of what is requested, and if the requested content or service is available. If said details are not contained in the first request, said first peer may contact the second, requesting peer for these details. In a third step the first, requested peer may analyse if the second, requesting peer is permitted to access the requested contents or service, before in a fourth step either admitting or rejecting the requested access. Said admitting or rejecting the requested access is independent from the previously described lock mechanism, e.g. password, as long as the requesting, second peer can unlock said mechanism, as depicted in FIG. 4 and described above.

The mentioned relation of trust between Owner Zones can be further specified as follows.

The mentioned relation of trust can be a unidirectional or bi-directional relation, meaning that if a first Owner Zone is a Trusted Zone relative to a second Owner Zone, then said second Owner Zone can, but needs not necessarily, be a Trusted Zone relative to said first Owner Zone. The exemplary relation between Trusted Zones shown in FIG. 4 is a bi-directional relation. It may be implemented such that either of two Owner Zones OZ_40,OZ_41 can detect if it is defined as Trusted Zone relative to the other Owner Zone, and suspend the relation of trust if this is not the case.

Figure 5:
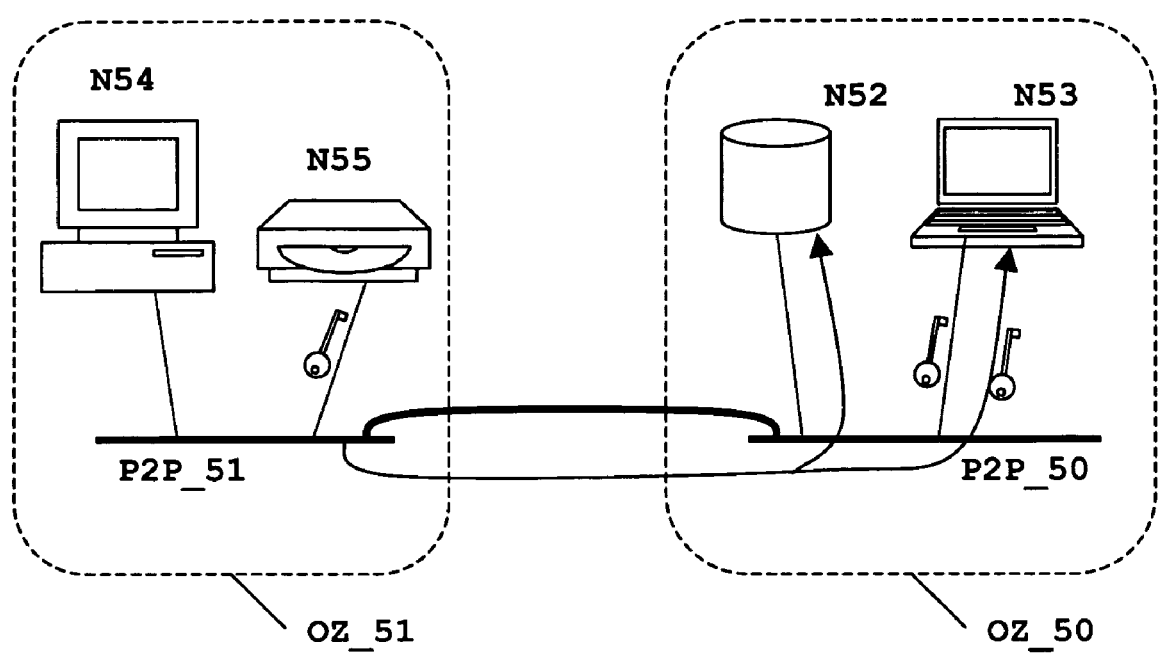
FIG. 5 an Owner Zone and exemplarily a related Trusted Zone, where the relationship of trust is unidirectional.

A unidirectional relation of trust is depicted in FIG. 5. A first Owner Zone OZ_50 is a Trusted Zone relative to a second Owner Zone OZ_51, but said second Owner Zone OZ_51 is not a Trusted Zones relative to said first Owner Zone OZ_50.

Consequently, the peers N54,N55 belonging to the second Owner Zone OZ_51 can access released content or services from the first Owner Zone OZ_50, but peers N52,N53 belonging to said first Owner Zone OZ_50 may not access content or services from the second Owner Zone OZ_51.

Figure 6:
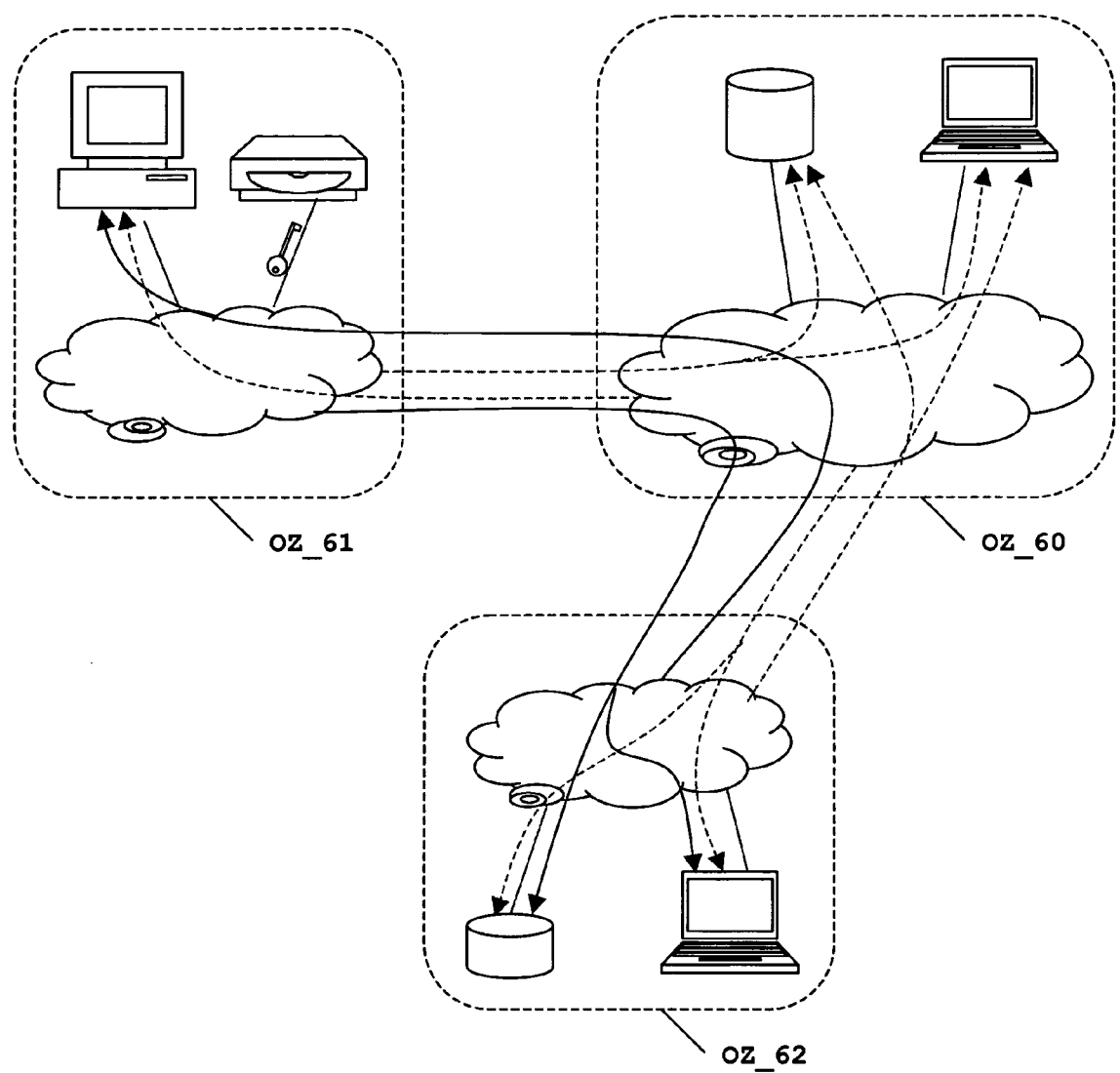
FIG. 6 two Owner Zones, being Trusted Zones to a third Owner Zone, and thus becoming Trusted Zones to each other.

The mentioned relation of trust can be valid explicitly for two specified Owner Zones, as in FIGS. 4 and 5, or may also include all other Owner Zones, which have a "Trusted Zone" relation to either, or both, of them. FIG. 6 shows a first Owner Zone OZ_60 being a Trusted Zone to a second Owner Zone OZ_61 and to a third Owner Zone OZ_62, where a relation of trust exists implicitly between the second Owner Zone OZ_61 and the third Owner Zone OZ_62, although they were not explicitly defined to be Trusted Zones to each other. In this case peers from Owner Zones OZ_61 and OZ_62 can access each other.

What is claimed is:

1. A method for communication between technical devices being nodes in networks, wherein a common group label is assigned to nodes being a member of a group of nodes, and wherein the nodes of said group can cooperate with all other members of the same group of nodes, including the steps of:

defining for the group of nodes one or more classes of group labels;

classifying one or more group labels into a first class;

detecting in a first node belonging to said group of nodes access from a second node;

detecting the group label of the second node;

permitting said access if the group label of the second node is equal to the group label of the first node;

otherwise determining if the group label of the second node is classified into the first class and;

permitting said access if the group label of the second node is classified into the first class, otherwise rejecting said access the first class of group labels has one or more subclasses, and wherein different types of accesses are defined depending on the subclass, and wherein also the subclass of the group label of the second node is determined.

2. Method according to claim 1, wherein the relation between groups of nodes is further specified by permitting, if a first group of nodes is allowed to access a second group of nodes, and the second group of nodes is allowed to access a third group of nodes, then this constellation leads to that said first group of nodes is allowed to access said third group of nodes, either with or without interaction of said second group of nodes.

3. Method according to claim 1, wherein a connection between two nodes has a status, the status defining whether both connected nodes belong to the same group of nodes or not.

4. Method according to claim 1, wherein the nodes of said group of nodes are assigned to or under control of the same user, or group of users.

5. Method according to claim 1, wherein each node is a member of not more than one group of nodes.

6. Method according to claim 1, wherein the access to contents or services within said group of nodes can be restricted by a user-independent lock mechanism.

7. Method according to claim 1, wherein said classification information is contained in a data set, the data set being readable for the nodes being a member of or having access to said group of nodes.

8. Method according to claim 1, wherein said providing of services or resources by said group of nodes to said accessing node is limited to a defined time frame.

9. Method according to claim 1, wherein the relation between groups of nodes is further specified such that if a first group of nodes is allowed to access a second group of nodes, then said second group of nodes is also allowed to access said first group of nodes.

10. Apparatus for performing communication between technical devices being nodes in networks, wherein a common group label is assigned to nodes being a member of a group of nodes, and wherein the nodes of said group can cooperate with all other members of the same group of nodes, the apparatus including means for defining for the group of nodes one or more classes of group labels;

means for classifying one or more group labels into a first class;

means for detecting in a first node belonging to said group of nodes access from a second node;

means for detecting the group label of the second node;

means for permitting said access if the group label of the second node is equal to the group label of the first node;

means for otherwise determining if the group label of the second node is classified into the first class; and means for permitting said access if the group label of the second node is classified into the first class, and for otherwise rejecting said access the first class of group labels has one or more subclasses, and wherein different types of accesses are defined depending on the subclass, and wherein also the subclass of the group label of the second node is determined.

* * * * *